(12) United States Patent
Mubarek

(10) Patent No.: US 11,587,433 B2
(45) Date of Patent: Feb. 21, 2023

(54) METHOD, APPARATUS, AND SYSTEM FOR PROBE ANOMALY DETECTION

(71) Applicant: HERE GLOBAL B.V., Eindhoven (NL)

(72) Inventor: Omer Mubarek, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 152 days.

(21) Appl. No.: 16/670,697

(22) Filed: Oct. 31, 2019

(65) Prior Publication Data

US 2021/0134149 A1 May 6, 2021

(51) Int. Cl.
*G08G 1/01* (2006.01)

(52) U.S. Cl.
CPC .................. *G08G 1/0129* (2013.01)

(58) Field of Classification Search
CPC .................................................. G08G 1/0129
USPC ......................................................... 701/118
See application file for complete search history.

(56) References Cited

U.S. PATENT DOCUMENTS

| | | | | |
|---|---|---|---|---|
| 8,615,354 B2* | 12/2013 | Barker | ................ | G08G 1/0104 701/119 |
| 9,349,285 B1* | 5/2016 | Fowe | .................. | G08G 1/0141 |
| 9,518,837 B2* | 12/2016 | Fowe | .................. | G08G 1/0104 |
| 9,558,660 B1* | 1/2017 | Fowe | .................. | G08G 1/0133 |
| 10,616,347 B1* | 4/2020 | Van Oort | ................ | H04L 47/11 |
| 2004/0225438 A1* | 11/2004 | Draganov | .............. | G01S 19/44 701/477 |
| 2007/0130248 A1* | 6/2007 | Thacher | ................ | H04W 4/027 709/202 |
| 2007/0213922 A1* | 9/2007 | Van Buer | ................ | H04W 4/44 701/117 |
| 2008/0046165 A1* | 2/2008 | Downs | ................ | G08G 1/0104 701/117 |
| 2009/0070035 A1* | 3/2009 | Van Buer | ............... | G01C 21/32 707/999.102 |
| 2010/0103032 A1* | 4/2010 | Zhodzishsky | ........... | G01S 19/43 342/357.26 |
| 2011/0112747 A1* | 5/2011 | Downs | ................ | G08G 1/0969 701/118 |
| 2011/0116367 A1* | 5/2011 | Mang | .................. | H04L 41/0663 370/228 |

(Continued)

FOREIGN PATENT DOCUMENTS

WO 2018122806 A1 7/2018

*Primary Examiner* — Kerri L McNally
*Assistant Examiner* — Thang D Tran
(74) *Attorney, Agent, or Firm* — Ditthavong, Steiner & Mlotkowski

(57) ABSTRACT

An approach is provided for providing probe anomaly detection. The approach, for example, involves determining an expected vehicle volume for a geographic region over a time epoch. The expected vehicle volume is calculated from historical vehicle volume data. The approach also involves determining an actual vehicle volume for the geographic region over the time epoch. The actual vehicle volume is based on current vehicle volume data collected from a plurality of vehicles traveling in the geographic region. The approach further involves computing a vehicle volume change based on the expected vehicle volume and the actual vehicle volume. The approach then involves providing the vehicle volume change as an indicator of a probe anomaly in the geographic region.

19 Claims, 11 Drawing Sheets

(56) References Cited

U.S. PATENT DOCUMENTS

| | | | |
|---|---|---|---|
| 2011/0224898 A1* | 9/2011 | Scofield | G08G 1/0104 701/532 |
| 2012/0072096 A1* | 3/2012 | Chapman | G08G 1/0133 701/117 |
| 2013/0191081 A1* | 7/2013 | Jain | G06F 30/00 703/1 |
| 2014/0105030 A1* | 4/2014 | Kogan | H04L 43/0847 370/242 |
| 2014/0114556 A1* | 4/2014 | Pan | G08G 1/0112 701/119 |
| 2014/0317124 A1* | 10/2014 | Kosuru | G01C 21/32 707/736 |
| 2015/0120174 A1* | 4/2015 | Lewis | G08G 1/0112 701/118 |
| 2015/0207875 A1* | 7/2015 | Avati | H04L 67/1095 709/203 |
| 2015/0221218 A1* | 8/2015 | Downs | G08G 1/0129 701/119 |
| 2015/0262480 A1* | 9/2015 | Fowe | G01C 21/3492 701/117 |
| 2015/0300835 A1* | 10/2015 | Fowe | G01C 21/20 701/410 |
| 2015/0381631 A1* | 12/2015 | Salem | H04L 63/102 726/4 |
| 2016/0073229 A1* | 3/2016 | Haro | H04W 4/021 455/456.3 |
| 2016/0171884 A1* | 6/2016 | Chen | G01C 7/04 701/117 |
| 2016/0189544 A1* | 6/2016 | Ricci | G08G 1/096827 701/117 |
| 2016/0265930 A1* | 9/2016 | Thakur | G05D 1/0088 |
| 2016/0284212 A1* | 9/2016 | Tatourian | G08G 1/096725 |
| 2016/0292999 A1* | 10/2016 | Watts-Fitzgerald | G08G 1/0129 |
| 2016/0300150 A1* | 10/2016 | Watts-Fitzgerald | G08G 1/0129 |
| 2017/0076217 A1* | 3/2017 | Krumm | G06N 20/00 |
| 2017/0268896 A1* | 9/2017 | Bai | G01C 21/3697 |
| 2017/0309171 A1* | 10/2017 | Zhao | G08G 1/096827 |
| 2017/0314936 A1* | 11/2017 | Dorum | G06F 16/00 |
| 2017/0345294 A1* | 11/2017 | Hirotsu | G08G 1/08 |
| 2018/0112990 A1* | 4/2018 | Fowe | G01C 21/3484 |
| 2018/0122227 A1* | 5/2018 | Mubarek | G08G 1/096844 |
| 2018/0174443 A1* | 6/2018 | Fowe | G08G 1/012 |
| 2018/0240026 A1* | 8/2018 | Pietrobon | G08G 1/0133 |
| 2019/0036954 A1* | 1/2019 | Garcia | H04L 63/1416 |
| 2019/0089634 A1* | 3/2019 | Jin | H04L 43/0882 |
| 2019/0250277 A1* | 8/2019 | Miya | G01S 19/08 |
| 2019/0322367 A1* | 10/2019 | El Idrissi | G08G 5/0069 |
| 2020/0090503 A1* | 3/2020 | Rolf | G08G 1/0129 |
| 2020/0099235 A1* | 3/2020 | Ito | H01M 10/44 |
| 2020/0111357 A1* | 4/2020 | Mubarek | G08G 1/0141 |
| 2021/0370983 A1* | 12/2021 | Oba | B60W 50/16 |

* cited by examiner

METHOD, APPARATUS, AND SYSTEM FOR PROBE ANOMALY DETECTION

BACKGROUND

Traffic and mapping service providers often use global position satellite (GPS) or equivalent probe data (e.g., time-stamped locations of probe vehicles traveling in a road network) to automatically infer traffic information. For example, these providers may employ an architecture, where external third party providers send probe data to the providers. The providers process the probe data and make decisions (e.g., issuing traffic alerts, rerouting traffic, dispatching maintenance crews, etc.) based on the received probe data. If there is a probe anomaly (e.g., unexpected changes to volume, quality, etc. of the received probe data) and the providers are not aware of it, then the decisions made by the providers may lead to incorrect conclusions or actions. Therefore, traffic service providers face significant technical challenge in detecting anomalies in the probe data they rely on for providing products or services.

SOME EXAMPLE EMBODIMENTS

Therefore, there is a need for an approach for automatically detecting probe anomalies, particularly when the anomalies are in probe data received from third party providers where information on how the probe data were collected may not be readily available. According to the various embodiments described herein, this technical need is addressed by using the volume or number of unique vehicles contributing probe data in a given geographic area rather than probe volume (e.g., the number or probe points collected from the vehicles in a geographic area) as an indicator of a probe anomaly.

According to one embodiment, a method comprises determining an expected vehicle volume for a geographic region over a time epoch, wherein the expected vehicle volume is calculated from historical vehicle volume data (e.g., data indicating the historical number of unique vehicles contributing probe data). The method also comprises determining an actual vehicle volume for the geographic region over the time epoch, wherein the actual vehicle volume is based on current vehicle volume data (e.g., data indicating the number of unique vehicles observed during the current time epoch) collected from a plurality of vehicles traveling in the geographic region. The method further comprises computing a vehicle volume change based on the expected vehicle volume and the actual vehicle volume. The method further comprises providing the vehicle volume change as an indicator of a probe anomaly in the geographic region.

According to another embodiment, an apparatus comprises at least one processor, and at least one memory including computer program code for one or more computer programs, the at least one memory and the computer program code configured to, with the at least one processor, cause, at least in part, the apparatus to determine an expected vehicle volume for a geographic region over a time epoch, wherein the expected vehicle volume is calculated from historical vehicle volume data. The apparatus is also caused to determine an actual vehicle volume for the geographic region over the time epoch, wherein the actual vehicle volume is based on current vehicle volume data collected from a plurality of vehicles traveling in the geographic region. The apparatus is further caused to compute a vehicle volume change based on the expected vehicle volume and the actual vehicle volume. The apparatus is further caused to provide the vehicle volume change as an indicator of a probe anomaly in the geographic region.

According to another embodiment, a non-transitory computer-readable storage medium carries one or more sequences of one or more instructions which, when executed by one or more processors, cause, at least in part, an apparatus to determine an expected vehicle volume for a geographic region over a time epoch, wherein the expected vehicle volume is calculated from historical vehicle volume data. The apparatus is also caused to determine an actual vehicle volume for the geographic region over the time epoch, wherein the actual vehicle volume is based on current vehicle volume data collected from a plurality of vehicles traveling in the geographic region. The apparatus is further caused to compute a vehicle volume change based on the expected vehicle volume and the actual vehicle volume. The apparatus is further caused to provide the vehicle volume change as an indicator of a probe anomaly in the geographic region.

According to another embodiment, an apparatus comprises means for determining an expected vehicle volume for a geographic region over a time epoch, wherein the expected vehicle volume is calculated from historical vehicle volume data. The method also comprises determining an actual vehicle volume for the geographic region over the time epoch, wherein the actual vehicle volume is based on current vehicle volume data collected from a plurality of vehicles traveling in the geographic region. The method further comprises computing a vehicle volume change based on the expected vehicle volume and the actual vehicle volume. The method further comprises providing the vehicle volume change as an indicator of a probe anomaly in the geographic region.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for probe anomaly detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
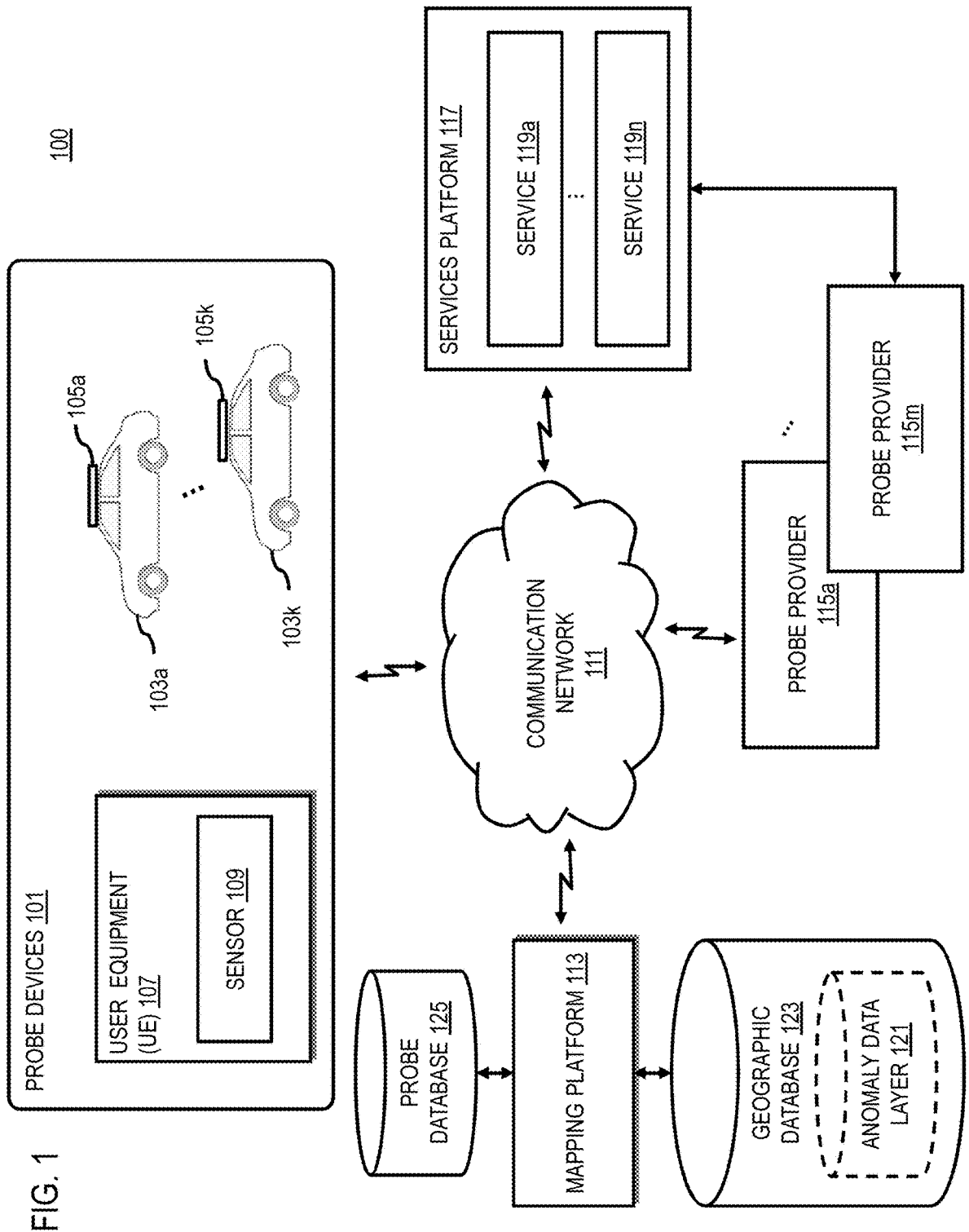
FIG. 1 is a diagram of a system capable of automatic probe anomaly detection, according to one embodiment.

FIG. 1 is a diagram of a system 100 capable of automatically detecting probe anomalies, according to one embodiment. A component of a comprehensive traffic and map product in today's connected world requires accurate probe data. Generally, probe data is set of probe points (also referred to as probes) representing the sensed or detected locations of probe devices 101 traveling in a geographic area (e.g., a global area, country, region, and/or any other designated geographic boundary). In one embodiment, a probe point includes at least one a unique probe identifier (ID), sensed geographic location and time (e.g., <probe ID, latitude, longitude, time>), and may include other related parameters such as, but not limited to, heading, speed, and/or the like. The unique probe ID enables the system 100 to correlate individual probes into trajectories traveled by a unique probe device 101 (e.g., vehicle 103 and/or UE 107).

In one embodiment, probe data can be collected from a number of sources such as the probe devices 101 which include, but are not limited to, vehicles 103-103$k$ (also referred to as vehicles 103) equipped with respective positioning sensors 105-105$k$ (also referred to as sensors 105 such as Global Positioning (GPS)/Global Navigation Satellite System (GNSS) receivers or equivalent) or user equipment (UEs) devices 107 (e.g., smartphones, personal navigation devices, portable computers, etc.) equipped with positioning sensors 109. For example, consumer vehicles 103 and/or UEs 107 traveling in a road network can collect probe data at varying frequencies (e.g., every second, 15 seconds, minute, etc.) specific to each probe device 101. The probe devices 101 can store the probe data or transmit the collected data over a communication network 111 in real-time, on demand, in batches, etc. The probe data can be any type of probe data used by a global mapping platform with one example being a global position satellite (GPS) probe data.

In one embodiment, a mapping platform 113 (e.g., operated by traffic service providers, map providers, etc.) uses probe data to automatically infer traffic information, traffic incidents, road geometry, and/or other related map features to provide up-to-date information about a road network. The mapping platform 113 can employ an architecture, where external third party probe providers 115$a$-115$m$ (also collectively referred to as probe providers 115) collect and send probe data to the mapping platform 113. For example, a probe provider 115 may be an automobile original equipment manufacturer (OEM) that collects probe data from its consumer vehicles 103 operating on the public road network. Therefore, the mapping platform 113 can receive probe data from multiple probe providers 115 corresponding to different OEMs.

The mapping platform 113 alone or in combination with a services platform 117 and/or any of the services 119-119$n$ (also collectively referred to as services 119) of the services platform 119 can process the probe data and make decisions and/or take actions (e.g., issuing a traffic alert, rerouting traffic, dispatching maintenance crews, etc.) based on the received probe data. Many of these decision and/or actions depending on detecting trends, patterns, and/or the like in the probe data. For example, detecting that a traffic jam is occurring depends on detecting a traffic speed drop and/or traffic volume increase from the probe data collected from a road segment of interest over a given time period (e.g., a time epoch). However, the detection of these trends, patterns, etc. can be sensitive to potential anomalies or variations in the received probe data that can affect the accuracy or reliability of the inferences detected from the probe data.

In one embodiment, a probe anomaly is an unexpected drop in the volume or amount of probe data at any stage of the system 100 prior to the making an inference or the taking of decision based on the probe data is made by the system 100 (e.g., by the mapping platform, the services platform 119, and/or the like). A probe anomaly can happen due to several reasons, such as but not limited to: one or more external probe suppliers experience lower throughput; one or more external probe suppliers experience an outage, such that they are not sending any probe data; and a module, which processes probe data, is malfunctioning and is dropping probe data. A probe anomaly can also occur while all components of the system 100 are working as designed. For example, probe data may be low due to natural reasons causing fewer people to drive (e.g., and therefore fewer probe devices 101 to be traveling) such as holidays, weather, nation-wide events, etc. If there is a probe anomaly and the system 100 is not aware of it, then the decisions made or actions taken by the mapping platform 113, services platform 117, services 119, etc. may be based incorrect conclusions or inferences determined from the probe data. This, for instance, is because a lower probe volume may lead to higher variability in the probe data and increase the potential for that increase variability to result in increased error. Therefore, service providers face significant technical challenges to automatically detecting potential probe anomalies before the anomalies can affect the accuracy or reliability of services that depend on inferences drawn from the probe data.

To address these technical challenges, the system 100 introduces a capability to construct expected probe volumes for a given geographic area (e.g., country, region, city, neighborhood, street, etc.) over a period of time (e.g., a time epoch such as 5-minute segments of a day). Then, when the system 100 is monitoring live probes (e.g., real-time probe data), the system 100 can calculate actual probe volumes and compare the actual probe volumes to the expected probe volumes to detect a potential probe anomaly. More specifically, in one embodiment, the expected volume is based on summary statistics (e.g., mean, median, etc.) over the expected/historical values for all road segments in the selected region. Then, for the same region over the same time interval, the system measures actual vehicle volume observed in real-time. Finally, the system flags a probe anomaly if the actual volume differs (e.g., is lower or higher) than the expected volume by more than a threshold value.

The system 100 can then output the difference (e.g., a percent drop or a percent increase) between the actual/observed probe volumes and the expected/historical probe volume for the entire geographic area. Then individual road segments within the monitored geographic area can be flagged as being affected by a probe anomaly with the same anomaly magnitude as determined for the entire geographic area. In other words, in one embodiment, the detected difference between actual and expected probe volumes for an area can used as an indicator of a probe anomaly occurring on individual road segments in the area before any inferences are made about the individual road segments.

For example, an inference relating to a detection of a road closure can based on comparing an actual/observed probe volume on a given road segment with an expected/historical value of the road segment. However, if the observed drop in probe volume for the segment is due to an area-wide anomaly that resulted in reduced probe volumes for an entire geographic area (e.g., because a probe provider 115's collection system failed) and the road closure detection component attempting to detect the road closure has no data on the probe anomaly, the component may erroneously classify the road segment as having a road closure when in fact the drop in probe volume on that road segment is due to an area-wide anomaly unrelated to any road closure.

In one embodiment, the output or probe anomaly indicator can be stored in an anomaly data layer 121 of a geographic database 123 so that the probe anomaly indicator can be associated with the corresponding geographic area and/or road segment records in the geographic region affected by the probe anomaly. For example, if a probe anomaly (e.g., a percent drop in the actual/current probe volume from the expected/historical probe volume) is detected for a geographic region such as a country, then the anomaly data layer 121 can flag all of the road segments in the geographic database 121 that located with the country as being affected by the probe anomaly. Once the anomaly is no longer detected, the anomaly data layer 121 can be updated and the flags removed. In this way, any inferences may on a road segment basis can be adjusted based on the magnitude of the detected road anomaly for area containing the road segment.

In one embodiment, the system 100 makes a distinction between probe volume and unique vehicle volume in the probe data. For example, a probe device 101 (e.g., vehicle 103) sends probes periodically. This probe transmission frequency typically depends on the configuration imposed by the probe provider 115. Therefore, on the same road segment, within the same time period, two distinct or unique probe devices 101 can have very different probe counts from each other. An example of this difference is illustrated in the following scenario with two vehicles 103 acting as probe devices 101:

Vehicle 103a—transmits probes with a frequency of 1 probe per 1 second; and

Vehicle 103b—transmits probes with a frequency of 1 probe per 15 seconds.

Then based on the scenario above, in a one minute period, the system 100 receives 60 probes from Vehicle 103a and 4 probes from Vehicle 103b. Yet, there are only two vehicles 103a and 103b. In other words, in some cases (e.g., when probe devices 101 are transmitting probes at different frequencies), the total probe volume is not representative of unique vehicle volume. Furthermore, if there is a probe anomaly, the anomaly affects all of the probes and not some of the probes of an affected vehicle 103. In other words, if a probe provider 115 is experiencing a probe data outage, none of the probes of the affected vehicles 103 of the probe provider 115 will reach the mapping platform 113. Similarly, if there is a holiday where fewer probe devices 101 are traveling, what is reduced to cause the probe anomaly is the probe device 101 count. Accordingly, in one embodiment, the system 100 uses the volume of unique vehicles in an area to detect probe anomalies and not the probe volume directly. In other embodiments, the system 100 can use probe volume (e.g., when probe transmission frequencies are relatively uniform across probe devices 101). It is also noted that although the various embodiments described herein are discussed with respect to unique vehicle volumes, it is contemplated that the embodiments are also applicable to probe volumes that are represented as the number of individual probe points received.

In one embodiment, the probe anomaly output (e.g., percent or ratio of actual/observed volume to expected/historical volume) can be used for any application or service that is dependent of probe data. For example, under a traditional approach, the system 100 (e.g., the mapping platform 113, services platform 117, services 119, etc.) may react to a detected difference (e.g., indicator of a probe anomaly) between actual and expected probe volumes by making an inference that same event of interest is taking place (e.g., traffic incident, road closure, etc.) and outputs the inference to the end user. However, if this difference between expected and actual volumes occurred due to a probe anomaly that affecting the probe collection system, then the inference based on the detected difference may likely be incorrect. Thus, automatically detecting when such probe anomalies (e.g., an unexpected drop in probe volumes not related to the inference being made) can advantageously improve the accuracy and reliability of probe data inferences.

Figure 2:
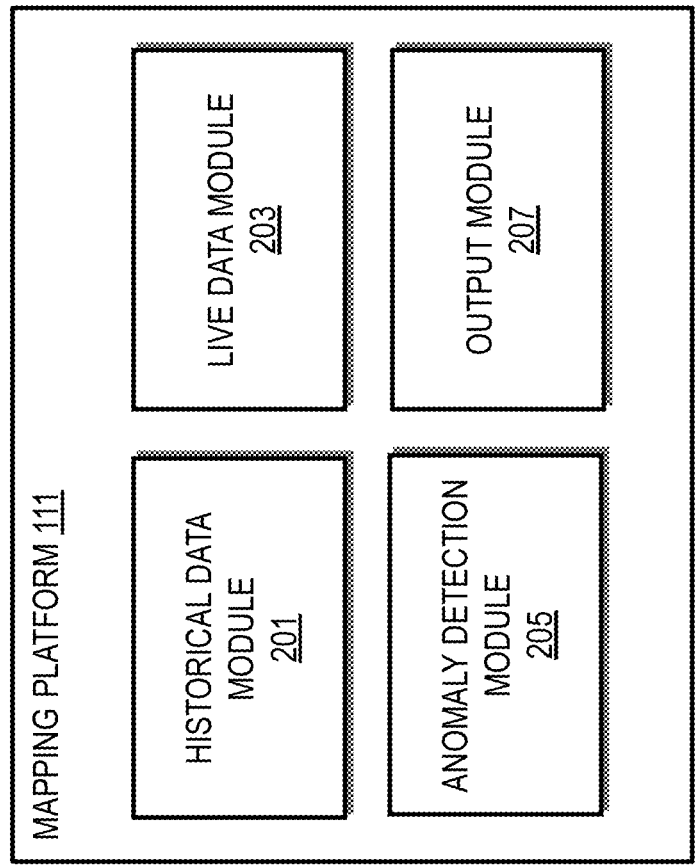
FIG. 2 is a diagram of the components of a mapping platform configured to automatically detect probe anomaly indicators, according to one embodiment.

In one embodiment, as shown in FIG. 2, the system 100 includes a mapping platform 113 that includes one or more components for automatically detecting probe anomalies according to the various embodiments described herein. It is contemplated that the functions of these components may be combined or performed by other components of equivalent functionality. As shown, in one embodiment, the mapping platform 113 includes a historical data module 201, live data module 203, anomaly detection module 205, and an output module 207. The above presented modules and components of the mapping platform 113 can be implemented in hardware, firmware, software, or a combination thereof. Though depicted as a separate entity in FIG. 1, it is contemplated that the mapping platform 113 may be implemented as a module of any of the components of the system 100 (e.g., a component of services platform 117, services 119, probe provider 115, etc.). In another embodiment, one or more of the modules 201-207 may be implemented as a cloud-based service, local service, native application, or combination thereof. The functions of the mapping platform 113 and modules 201-207 are discussed with respect to FIGS. 3-6 below.

Figure 3:
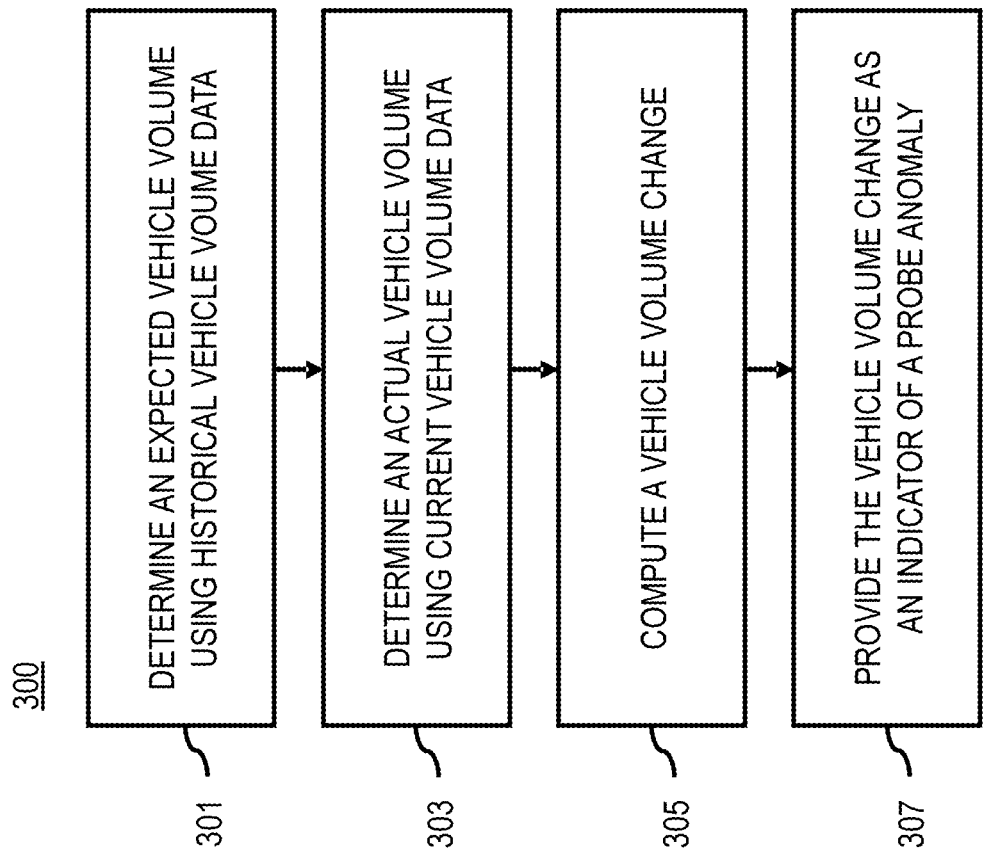
FIG. 3 is a flowchart of a process for automatic probe anomaly detection, according to one embodiment.
Figure 9:
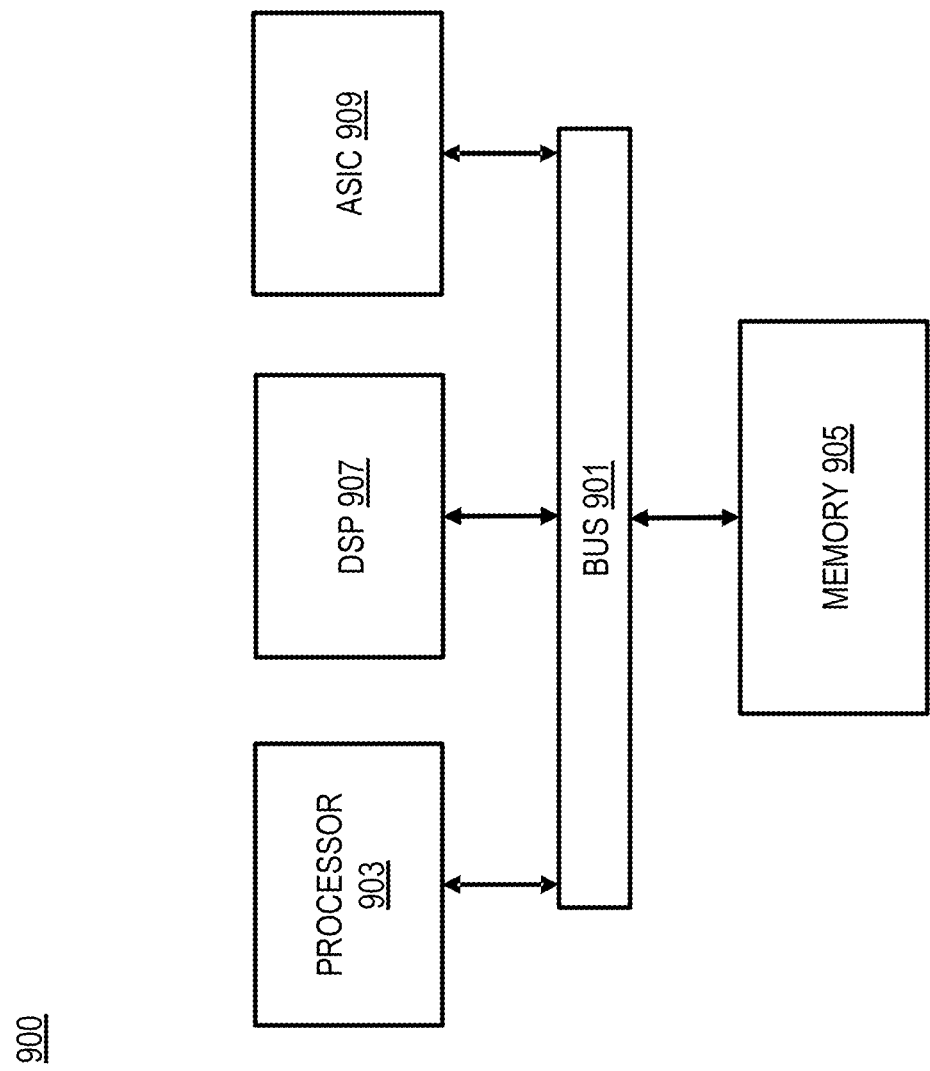
FIG. 9 is a diagram of a chip set that can be used to implement an embodiment.

FIG. 3 is a flowchart of a process for automatic detection of probe anomaly indicators, according to one embodiment. In various embodiments, the mapping platform 113 and/or any of the modules 201-207 may perform one or more portions of the process 300 and may be implemented in, for instance, a chip set including a processor and a memory as shown in FIG. 9. As such, the mapping platform 113 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

Figure 4:
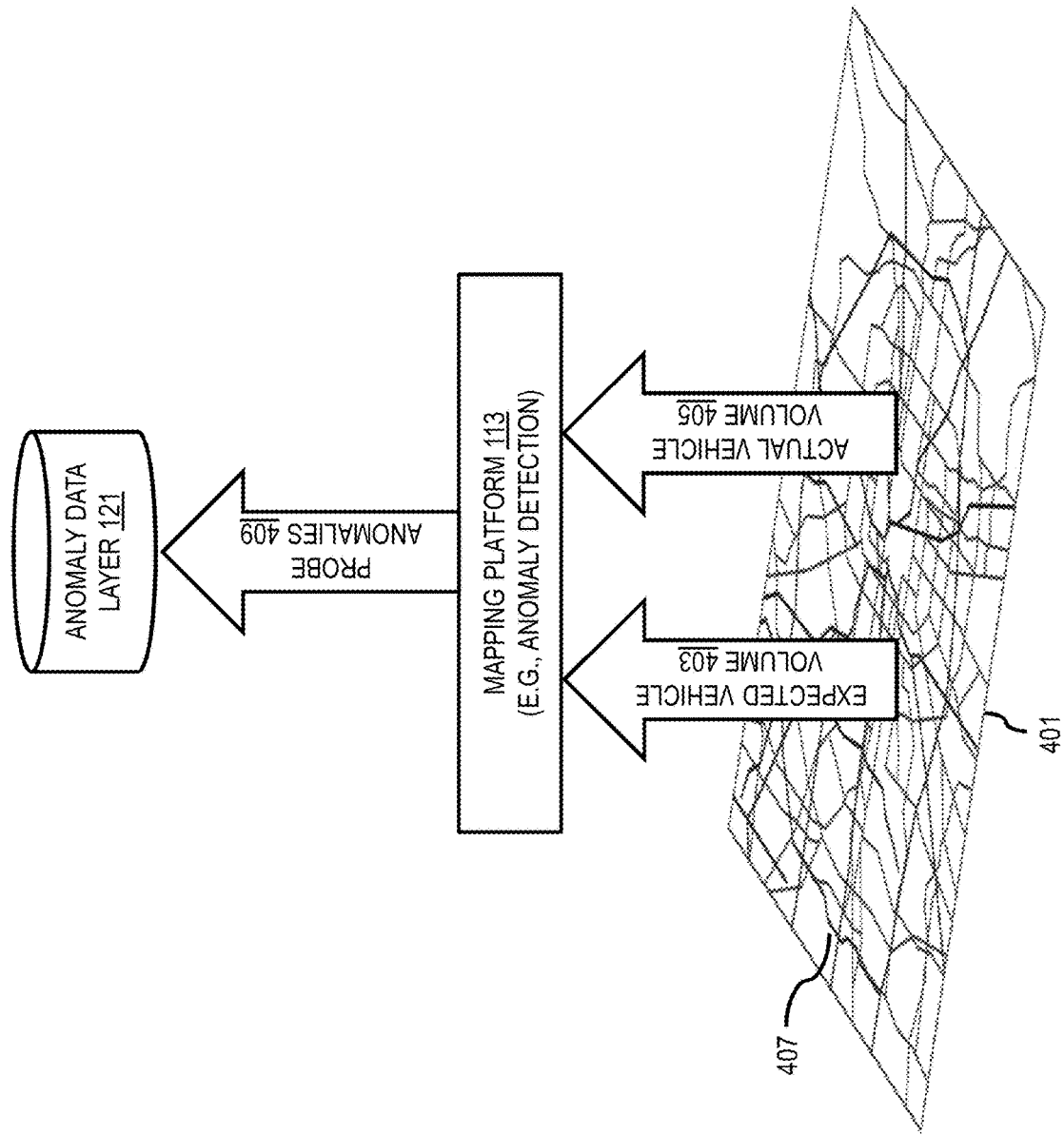
FIG. 4 is a diagram illustrating a link graph, according to one embodiment.

The various embodiments of the process 300 are summarized with respect to FIG. 4. As shown, for a geographic region or area 401 (e.g., country, city, bounding box, etc.), the mapping platform 113 calculates an expected vehicle volume 403 using historical probe data and an actual vehicle volume 405 using real-time data collected from the area 401. As discussed above, the expected vehicle volume 403 and actual vehicle volumes can be summary statistics (e.g., mean, median, etc.) over the road segments 407 contained in the geographic area 401. As part of the probe anomaly detection process 300, the mapping platform 113 can calculate the expected vehicle volume 403 and the actual vehicle volume 405 as follows:

Expected vehicle volume 403 (Expected_Volume): represents the total expected unique vehicle volume using historical data over a time epoch, where examples of time epoch values can be but are not limited to 1 minute, 5 minutes, 1 hour etc. In other words, a time epoch can be used to segment a period of time (e.g., a day) by discrete time windows. For example, a 5-minute time epoch would result in segment a 24-hour day into 288 individual time epochs. In one embodiment, the time epochs can be numbered 0-287 which is repeated for each day, so that the same numbered time epoch occurs in the same 5-minute time window for each day).

Actual vehicle volume 405 (Actual_Volume): When the mapping platform 113 is live and actively collecting real-time or near-real-time probe data, for the same epoch unit used in calculating Expected_Volume, the mapping platform 113 calculates the total volume of unique vehicles observed in the same region. This parameter is derived from live probes in real-time.

Then, in embodiments where the probe anomalies 409 are detected or indicated as drops (although other embodiments may also detect anomalies based on increases), probe anomalies 409 can be expressed in terms of a probe volume drop (Volume_Drop), which can be quantified as follows:

Volume_Drop=max(0, (Expected_Volume−Actual_Volume)/Expected_Volume);

Volume_Drop=max(0, (1−Actual_Volume/Expected_Volume); or equivalent.

The probe anomalies 409 can then be stored in the anomaly data layer 121 of the geographic database 123. The summarized process 300 is described in more detail below.

In step 301, the historical data module 201 determines an expected vehicle volume for a geographic region over a time epoch using historical vehicle volume data. In one embodiment, the mapping platform 113 can perform anomaly detection for various sizes of regions (e.g. continent, country, city, or any bounding box). As the region size varies, so does the number of road segments, from which the expected volume summary statistics are derived. Smaller regions with a low number of road segments can create statistics with high variance between time epochs, and therefore these smaller regions can be susceptible to false anomaly detections. Accordingly, in one embodiment, the historical data module 201 can monitor variance as the selected size of the geographic region varies.

For example, large regions can contain a high number of road segments; hence the summary statistics derived for these larger regions are expected to have small variance from one epoch to the neighboring epoch. However, a severe probe anomaly happening only in one part of that region could be detected as a mild anomaly over the entire region, and the response of the system would be over the entire region. If the response is to shut down operations in affected regions, then the entire region would be shut down, even though the probe anomaly is occurring only at one part of the region.

Therefore, in some embodiments, it can be beneficial to monitor many smaller regions (e.g., countries instead of continents, cities instead of countries, etc.). Yet, as the region gets smaller, so does the number of road segments over which the summary statistics are calculated. This can increase the potential of having high variance between neighboring epochs in that small region, which in turn runs the risk of flagging false anomalies. For example, if the expected volume over a small bounding box varies drastically from 10:00 to 10:05 and again from 10:05 to 10:10, so could the actual real-time volume. Then at 10:05, due to high variance, expected volume could be much higher than its neighboring epochs and actual volume could be much lower. As a result, the system would detect a false anomaly.

Figure 5A:
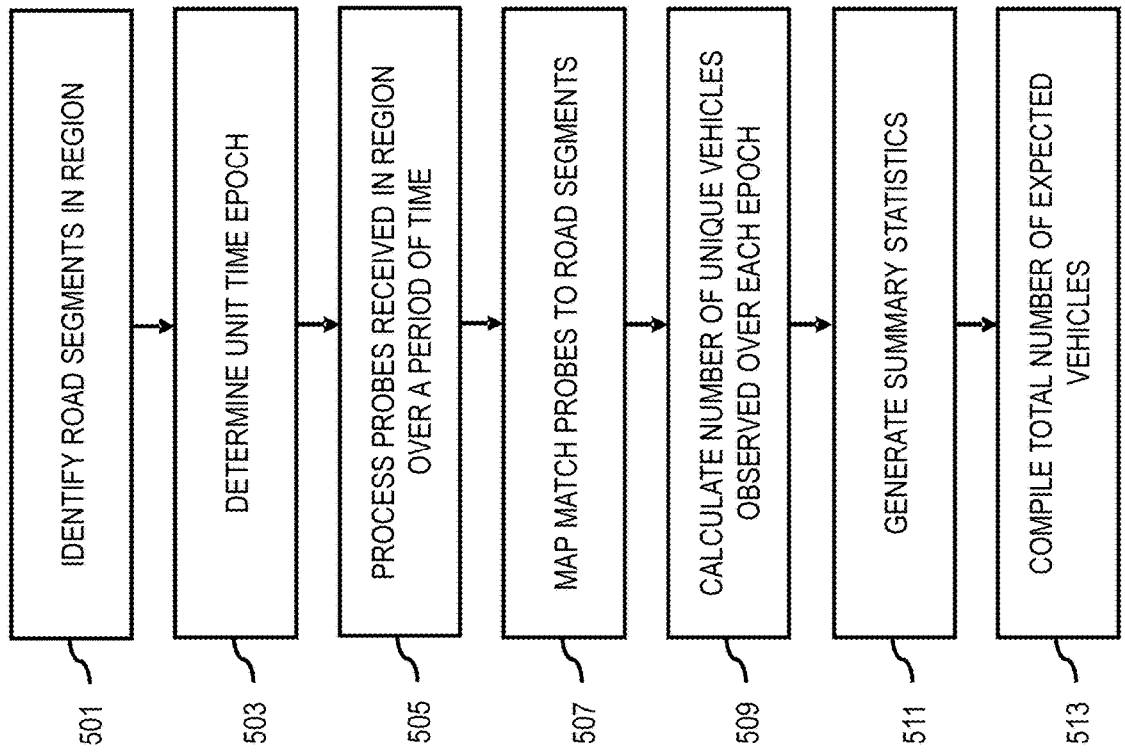
FIG. 5 is diagram of aggregating road links of a graph into superlinks, according to one embodiment.

After the size of the geographic region or area for performing the anomaly detection is selected, the historical data module 201 can determine the expected vehicle volume for the region according to the process 500 of FIG. 5A or equivalent. As shown, in step 501, the historical data module 201 identifies the road segments located within the selected geographic region. For example, the historical data module 201 can use the boundaries of the selected geographic area as a search term for a location-based query of the geographic database 123. The road links can be the complete set of road links (e.g., all road links represented in the selected geographic area) or a portion thereof (e.g., a subset of the road segments or links in the selected geographic area such as road segments meeting a minimum functional class or other attribute). By way of example, a road link is the unit representation of a roadway in a digital map such as the geographic database 123. Additional description of a link data record is described below with respect to FIG. 7. Generally, a roadway between two consecutive intersections can be represented by one or more links.

In step 503, the historical data module 201 determines a unit time epoch for processing the historical probe data to determine the expected vehicle volume for the geographic region. In addition, the unit time epoch can be any designated period of time such as, but not limited to, 1 minute, 5 minutes, 1 hour etc. Shorter time epochs, for instance, can result in faster detection of certain probe anomalies, but selecting shorter time epochs can result in higher inter-epoch variance of the resulting vehicle volumes for each epoch. Conversely, selecting longer time epochs, can potentially reduce or smooth out inter-epoch variances, but may increase the time needed to detect a probe anomaly. Accordingly, in geographic areas with less variance, shorter unit time epochs can be selected, and in areas with higher variance, longer unit time epochs can be selected.

In step 505, the historical data module 201 can retrieve and process historical probe data received from probe devices 101 traveling in the selected region over a period of time. For example, if Germany is a region of interest, historical probe data collected from Germany over a period of the previous year (or other designated time period) can be retrieved from the probe database 125 or equivalent datastore (e.g., maintained by the probe providers 115, services platform 117, and/or services 119). The historical data module 201 can determine the designated historical time period of the historical probe data to retrieve based on available data, available computing resources (e.g., processing power, memory, bandwidth, etc.), and/or other equivalent factors.

In step 507, the processing of the historical probe data includes map matching the historical probe data to the corresponding road links identified in the geographic area of interest (e.g., as identified in step 501). The historical data module 201 can use any map matcher (e.g., point-based map matcher or trajectory-based map matcher) to assign a probe to a respective road link identified in the geographic area. For example, the historical probe data includes location data sent from probe devices 101 indicating their respective locations by, for instance, a latitude and longitude pair. Each historical probe point is mapped onto the most probable road link on the map using any map matching process known in the art. One example of how the map-matching process works is described in the following section. A map comprises a network of road segments that are defined by a set of links and their geographic coordinates. Because GPS (or other similar location positioning technology) is not 100% accurate, the geocoordinates of a probe often do not fall onto a corresponding road link perfectly. To account for this error, map matching algorithms take the geocoordinates of a probe, and find the neighboring links whose coordinates are close to the probe. Then, the map matching process places the probe onto the most probable link based on pre-defined criteria specific to the specific map matching process or algorithm being used.

In one embodiment, to better control for map matching error, the historical data module 203 works with probe paths instead of map matched probe points. A probe path is the path that the device that is sending the probe data is appearing to take. In this example, the probe path corresponds to a vehicle or device path because the probe data is being sent from sensors on a probe device 101 (e.g., a vehicle 103 and/or UE 107). Point-based map matching can be more susceptible to map matching errors compared to trajectory or path-based map matching. By way of example, a probe path or trajectory can be derived by grouping probes according to their respective probe IDs and the sorting them grouped probes by time to create a time-sequence set of probes for each corresponding probe device 101. As new probe points are collected, the vehicle path can then be increased by adding the new points on top of the previously calculated vehicle path based on their probe IDs.

In step 509, after the map matching of the retrieved historical probes, the historical data module 201 calculates the total number of unique vehicles observed over each epoch of the historical probe data. The epochs are determined by segmenting the historical time period over which the historical probe data were retrieved by the selected unit time epoch (e.g., selected according to step 503). For example, if the historical probe probes were retrieved from a one year period and the unit time epoch was selected as 5 minutes, then the one year of historical probe data is segmented into 288 time epochs for each day of the year. The historical vehicles observed on each segments can then be derived from the map-matched probes (e.g., map-matched according to step 507) or by first generating paths for the probe devices 101 from the path and then counting the number of unique vehicles (e.g., identified by probe ID). At the end of the step 509, the historical data module provides the counts of unique historical vehicles for each road segment in each of the time epochs.

In step 511, for each road link, the historical data module 201 generates a summary statistic of unique historical vehicle volumes for time epoch. A summary statistic can be generated using a number of methods including mean, median, p percentiles, etc. overall all historical vehicles observed on each road segment in each time epoch over a year's time (or other designated historical time period). As noted, the summary statistics can be calculated over the entire historical data for each road segment over the entire designated time period or can be stratified according to a contextual parameter (e.g., a temporal parameter) such as but not limited to: (1) by data, e.g., expected number of vehicles between 10:00-10:05 for Monday, Tuesday, . . . , Sunday; (2) whether the day is a weekend or a weekday; (3) seasonally, e.g., spring, summer, fall, and winter; and/or the like. In this way, the historical data module 201 can generate summary statistics for each road segment and time epoch by day of the week, weekend versus weekday, season, etc. This stratification can be used to detect or model expected volume patterns occurring over these different contexts.

In step 513, the historical data module 203 calculates the expected vehicle volume for a geographic region over each time epoch using the historical summary statistics. In one embodiment, the expected vehicle volume is calculated by summing the historical summary statistics of all road segments that belong to the designated geographic region to complete the step 301 of the process 300 of FIG. 3. In one embodiment, the expected volume data can be computed offline over historical data and stored (e.g., in the anomaly data layer 121) for subsequent use and comparison against live probe data for anomaly detection in the selected geographic area.

Figure 5B:
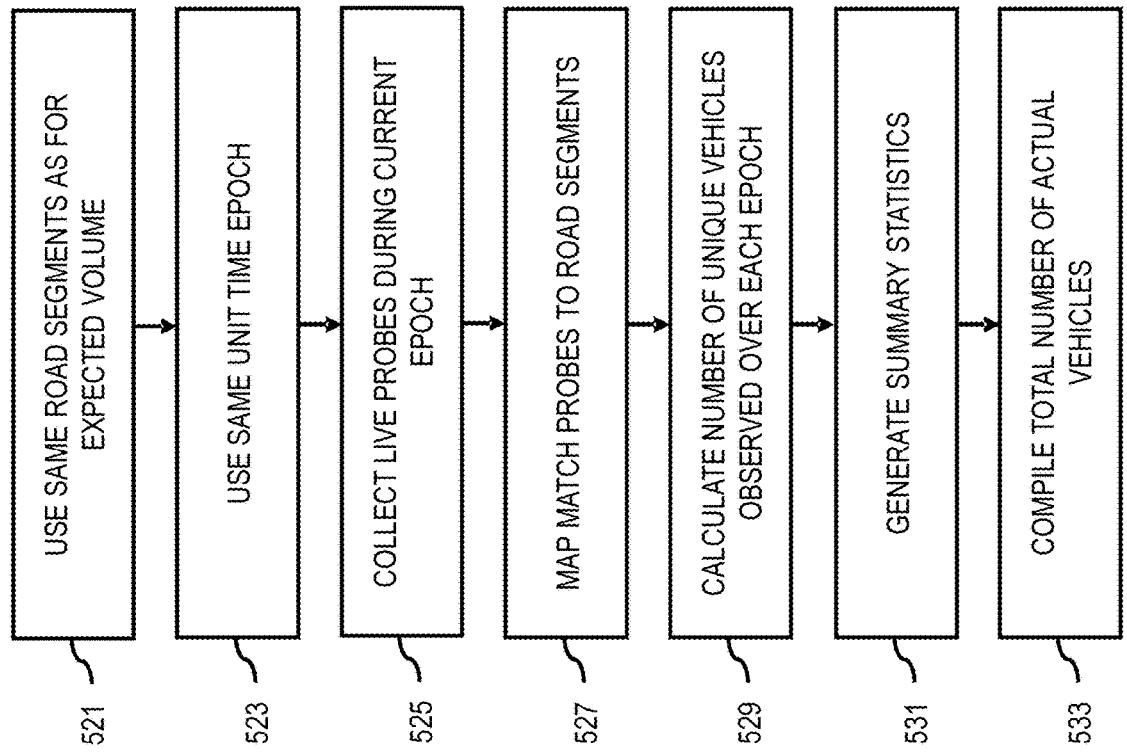

Returning to the process 300 of FIG. 3, in step 303, the live data module 203 determines an actual vehicle volume for the selected geographic region over a time epoch of interest. The time epoch of interest is generally the current time epoch or the time epochs within a designated time window of the current time. In one embodiment, the actual vehicle volume is based on current vehicle volume data collected from a plurality of vehicles traveling in the geographic region. FIG. 5B illustrates an example process 520 for calculating an actual vehicle volume.

In step 521 of the process 520, the live data module 203 uses or otherwise determines the same set of road segments for the selected geographic area that was used for calculating the expected vehicle volume as described in the embodiments of the step 301 of the process 300 of FIG. 3 above. In one embodiment, the live data module 203 can retrieve the list of road segments from the geographic database 123 or other equivalent datastore. The same road segments are retrieved to ensure the consistency of map matching between the historical and live probe data. In step 523, the live data module 203 also uses the same unit time epoch as used for calculating the expected volume to ensure comparability of the expected volume to the actual volume on an epoch-by-epoch basis.

In step 525, the live data module 203 collects live probes received within the geographic region of interest during the epoch of interest. For example, probes received within the past 5 minutes or other designated unit time epoch can be considered live or real-time for purposes of calculating actual vehicle volumes. In other words, the probe data is received in real time or close to real time. The probe point data is generated using positioning sensors onboard the probe devices 101 currently traveling in the geographic area of interest. As discussed above, the probe data includes probe points, which in turn specify at least a location of the vehicle and a timestamp indicating when the location was determined by the location sensor 115, as well as a probe ID for determining unique probe devices 101 contributing the probe data.

In step 527, as with the analogous step 507 of FIG. 5A, map matching and/or vehicle pathing can be used to match the live probe data with the corresponding road links in the geographic area of interest. In other words, the live data module 203 can use the embodiments of map matching and vehicle pathing processes, discussed above with respect to step 507 for map matching the historical probe data can also be used for the live probe data. By using the same map matching processes, algorithms, etc., the live data module 203 can help to ensure consistency of probe assignments to corresponding road links to improve probe anomaly detection when comparing against the expected volume data generated above.

In step 529, for each road segment in the geographic region, the live data module 203 calculates the total number of unique vehicles observed in the time epoch(s) (e.g., the most recently completed time epoch) during which the live probe data was collected. The live data module 203 can use the same process for calculating the total number unique live vehicles as for calculating the total number of unique historical vehicles according to the embodiments of the step 509 of FIG. 5A described above.

In step 531, for each road link, the live data module 203 generates a current summary statistic of actual vehicle volume for the designated epoch using the calculated total number of live probe data in the same way as discussed above with respect to the embodiments of step 511 of FIG. 5A. A summary statistic, for instance, can be generated using a number of methods including mean, median, percentiles, etc. The summary statistics can be stratified according to different contextual features such as but not limited to the temporal features described above with respect to step 511. Finally, in step 533, the live data module 203 compiles the total number actual vehicles in the given geographic region by summing up the summary statistics of all road segments that belong to the geographic region of interest. In summary, the actual volume is calculated real-time over live probe data using processes analogous to those used for calculating the corresponding expected or historical volume. This final total number of actual vehicles can then be provided as an output to complete the step 303 of the process 300 of FIG. 3.

Returning to step 305 of the process 300 of FIG. 3, the anomaly detection module 205 computes a vehicle volume change based on the expected vehicle volume and the actual vehicle volume determined above. In one embodiment, the vehicle volume change metric can be calculated by considering the expected volume and actual volume for the most recent epoch (or any time epoch used for calculating the actual volume). For instance, if the selected unit time epoch is 5 minutes long, the volume change metric can be calculate using expected and actual volumes over the past 5 minutes (e.g., the most recent time epoch). The volume change can be calculated as a ratio of the actual volume to expected volume (or any other equivalent metric such as but not limited to a difference between the actual and expected values). Accordingly, a ratio less than 1 indicates that there is a volume drop, and a ratio greater than 1 indicates that there is a volume increase relative to the expected/historical value for the geographic region.

However, in one embodiment, if the expected volume varies beyond a threshold variance from epoch to epoch (e.g., high inter-epoch variance), the anomaly detection module 205 alone or in combination with the historical data module 201 can smooth the computed expected volume data over multiple epochs. For example, even if the unit time epoch is set as 5 minutes, the anomaly detection module 205 can smooth the expected volume by binning and smoothing the smaller time epochs (e.g., 5 minutes) into longer time epochs such as but not limited to the past 30-minutes (e.g., corresponding to 6 unit time epochs), 60 minutes (e.g., corresponding to 12 unit time epochs). It is contemplated that the anomaly detection module 205 can use any smoothing technique (e.g., averaging over the increased smoothing time such as 30 minutes, 60 minutes, etc.).

Figure 6:
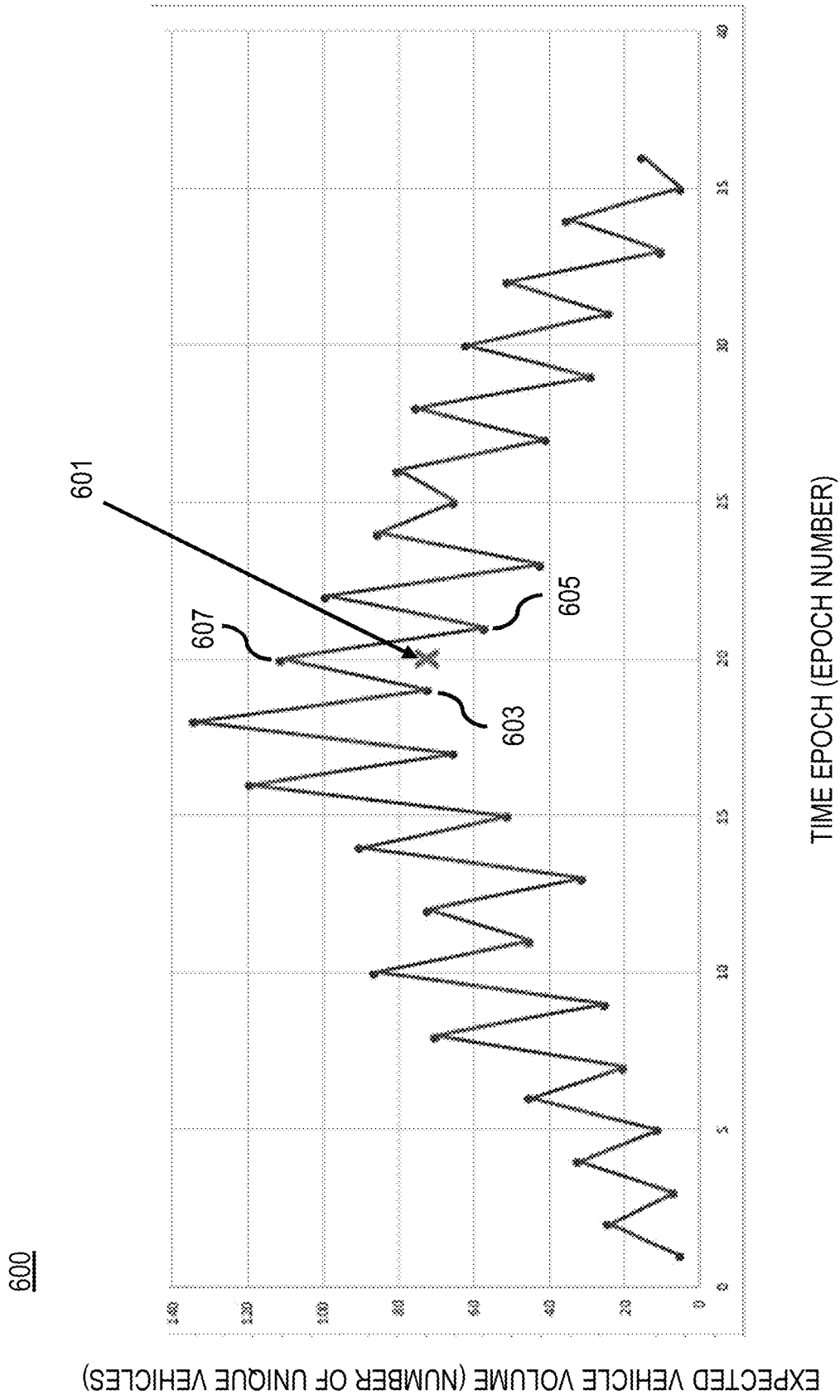
FIG. 6 is a diagram of expected vehicle volume data, according to one embodiment.

FIG. 6 is diagram of expected vehicle volume data displaying high variance, according to one embodiment. In this example, the graph 600 plots the calculated expected vehicle volume (on the y-axis) over a range of time epochs 0-40 (on the x-axis) for a geographic area of interest. As shown, the expected volumes over time epochs have very high local variance—e.g., total expected volumes vary by more than a threshold variance among neighboring epochs. In this example, the historical data module 201 calculates and plots the expected vehicle volume over each epoch from 0-40. As shown, each epoch corresponds to a 5-minute interval, but any unit time epoch may be used. For example, using a 5-minute epoch starting at 10:00, the first point plotted on the graph 600 represents the expected vehicle volume for a time epoch corresponding to 10:00-10:05 am, while the second point represents the expected vehicle volume for a neighboring time epoch corresponding to 10:05-10:10 am.

High local variance (e.g., variance between neighboring nodes) as illustrated in FIG. 6 can cause inaccurate probe anomaly detection. For example, as seen at epoch 20, the live data module 203 could potentially measure or calculate an actual vehicle volume 601 indicated by an "X", which is very similar to the expected volume 603 of the neighboring epoch 19 and the expected volume 605 of the neighboring epoch 21. Yet, due to high local variance, epoch 20 has a much higher expected volume 607 and therefore, the mapping platform 113 would likely flag a probe anomaly based on the ratio of the actual volume 601 to the expected volume 607 indicating a significant volume drop even though the anomaly would like be false due to the high variance.

High local variance from epoch to epoch can happen due to noisy data and/or due to a small dataset. Expanding on the latter, in one embodiment, it is possible to detect a probe anomaly for different region sizes such as for an entire country or for a city or a much smaller area. For example, when monitoring the entire country for probe anomalies, if a small portion of the country (e.g., a city) experiences a volume drop, this anomaly might go unnoticed or be detected as much less severe when mixed with the entire country's probe data (which is not experiencing an anomaly).

Furthermore, consider an example where again only a big city within a country is experiencing volume drop, but the drop is sufficiently severe such that it is still visible even when considering all probes in the country. Since the anomaly is measured over the entire country (even though it is happening only on one city), counter measures would be implemented for the entire country instead of just in the affected city. An example of a counter measure could be to shut down certain services in regions affected by the probe anomaly. This means that due to an anomaly in a city, services in the entire country could be disabled. In one embodiment, to prevent such measures, the anomaly detection module 205 can limit the size of a region for detecting anomalies.

However, as these regions become smaller, their expected volume data is subject to potentially higher local variance as illustrated in FIG. 6. Accordingly, in one embodiment, the anomaly detection module 205 can analyze the expected volume and/or underlying probe data to decide whether the expected volume data has high variance. As part of this decision process, the expected volume data can be calculated for each epoch covering the entire day. For instance, if an epoch is 5 minutes long, then there would be 288 such epochs which cover the full 24 hours of a day (24 [hrs]*60 [mins/hrs]/5 [mins/epoch]). In one embodiment, the anomaly detection module 205 can then compute the variance in expected volume values over the entire day. If the variance is high (e.g., variance exceeds a given threshold), then it can be concluded that the data has high variance. If high variance is detected, then the entire dataset would go through a smoothing operation until the variance is below a threshold. Examples of smoothing operations are moving averages, splines, etc. In one embodiment, the anomaly detection module 205 can start with moderate smoothing and increment the level of smoothing until the variance falls under the threshold. For instance, in case of moving averages, it would start with a sliding window of size 2 unit time epochs and increment the window size until the variance falls below the threshold.

In some cases, the approach describe above may not be applicable. For example, it is natural for vehicle/probe volume data to fluctuate throughout the day: morning and evening rush hours have high volumes, whereas midnight experiences low volumes. Therefore, expected volume data could have high variance over an entire day even though neighboring epochs might not have high variance (which is what is generally desired).

In such a case, an alternate embodiment involves the anomaly detection module 205 calculating variance locally per each epoch. For example, given an epoch e, the anomaly detection module 205 constructs a dataset starting from n epochs before e and ending at an nth epoch after e (e.g., 2n+1 epochs with e being in the center). If the variance in this dataset is high, it means there is high local variance among the neighboring epochs of e. Then, similar to the embodiment described above, variance could be reduced by applying a smoothing operation to the expected volume dataset. It is noted that with embodiments of this localized approach, certain epochs of the expect expected volume dataset might require smoothing, whereas others might not. Furthermore, the epochs that require smoothing might undergo different levels/techniques of smoothing (e.g., moving averages, splines, or equivalent).

In one embodiment, the expected volume data is calculated offline, and the smoothing operation can also be applied offline. When running the anomaly detection system live and calculating the actual volume, the same smoothing operations can be applied to the actual volume over the specified epochs. For instance, if expected volume at epoch 100 is calculated as a moving average over 6 epochs (e.g., epochs 95-100 out of 288 daily 5-minute time epochs), then the actual volume can also be calculated as a moving average of the actual volume values at epochs 95-100. Then, volume change (e.g., volume drop or increase) can be calculated over these smoothed expected and actual volumes.

In step 307, the output module 307 provides the vehicle volume change as an indicator of a probe anomaly. In other words, the volume change can be expressed as a ratio, and the value of the ratio can indicate a direction of the change (e.g., a volume drop for a ratio below 1, and a volume increase for a ratio above one). In one embodiment, the output does not make a binary classification of whether a probe anomaly exists or does not exist. Instead, the value of the ratio provides an indication or adjust factor that inference modules or components can use to make corresponding adjustments if needed (e.g., adjusting a local road segment expected value based on the geographic probe anomaly indicator or value to provide a more accurate baseline for inferences on the road segment). In one embodiment, the output is stored and published in the data anomaly layer 121, where the anomaly ratio, difference, or other equivalent value is associated with the affected geographic region or road segments within the geographic region. For example, services 119 or applications requesting local expected values for road segments or sub-units of the geographic area can also retrieve the probe anomaly value or indicator and make a corresponding adjustment.

Returning to FIG. 1, in one embodiment, the mapping platform 113 has connectivity over a communication network 111 to other components of the system 100 including but not limited to services platform 117, services 119, probe providers 115, geographic database 123, and/or probe devices 101 (e.g., vehicles 103, UEs 107). By way of example, the services 119 may also be other third-party services and include probe data, traffic incident services (e.g., to report road closures), mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. physical divider predictions) of the mapping platform 113 to provide services such as navigation, mapping, other location-based services, etc.

In one embodiment, the mapping platform 113 may be a platform with multiple interconnected components. The mapping platform 113 may include multiple servers, intelligent networking devices, computing devices, components and corresponding software for providing parametric representations of lane lines. In addition, it is noted that the mapping platform 113 may be a separate entity of the system 100, a part of the one or more services 119, a part of the services platform 117, or included within the probe device 101 (e.g., vehicle 103, UE 107).

In one embodiment, probe providers 115 may provide probe data and/or other related content or data (e.g., including geographic data, parametric representations of mapped features, etc.) to the geographic database 123, the mapping platform 113, the services platform 117, the services 119, and the probe device 101 (e.g., vehicle 103, UE 107). The content provided may be any type of content, such as traffic incident content (e.g., road closure reports), map content, textual content, audio content, video content, image content, etc. In one embodiment, the probe providers 115 may provide content that may aid in the detecting and classifying of probe anomalies or traffic incidents. In one embodiment, the probe providers 115 may also store content associated with the geographic database 123, mapping platform 113, services platform 117, services 119, and/or prove device 101 (e.g., vehicle 103, UE 107). In another embodiment, the probe providers 115 may manage access to a central repository of data, and offer a consistent, standard interface to data, such as a repository of the geographic database 123.

In one embodiment, the probe devices 101 (e.g., vehicles 103, UEs 107), for instance, are part of a probe-based system for collecting probe data for detecting traffic incidents and/or measuring traffic conditions in a road network. In one embodiment, each probe device 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the probe devices 101 may include sensors for reporting measuring and/or reporting attributes. The attributes can also be any attribute normally collected by an on-board diagnostic (OBD) system of a vehicle, and available through an interface to the OBD system (e.g., OBD II interface or other similar interface). In one embodiment, this data allows the system 100 to calculate or construct probe paths of a probe device 101 over a stretch of road (e.g., over a link graph).

The probe points can be reported from the probe devices 101 in real-time, in batches, continuously, or at any other frequency requested by the system 100 over, for instance, the communication network 111 for processing by the mapping platform 113. The probe points also can be map matched to specific road links stored in the geographic database 123. In one embodiment, the system 100 (e.g., via the mapping platform 113) can generate probe traces (e.g., probed paths or trajectories) from the probe points for an individual probe device 101 so that the probe traces represent a travel trajectory or vehicle path of the probe device 101 through the road network.

In one embodiment, the probe device 101 (e.g., vehicle 103, UE 107) is configured with various sensors for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for evaluating road closure reports according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the probe device 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the probe device 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 113, services platform 117, services 119, probe device 101 (vehicle 103, UE 107), and/or probe providers 115 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
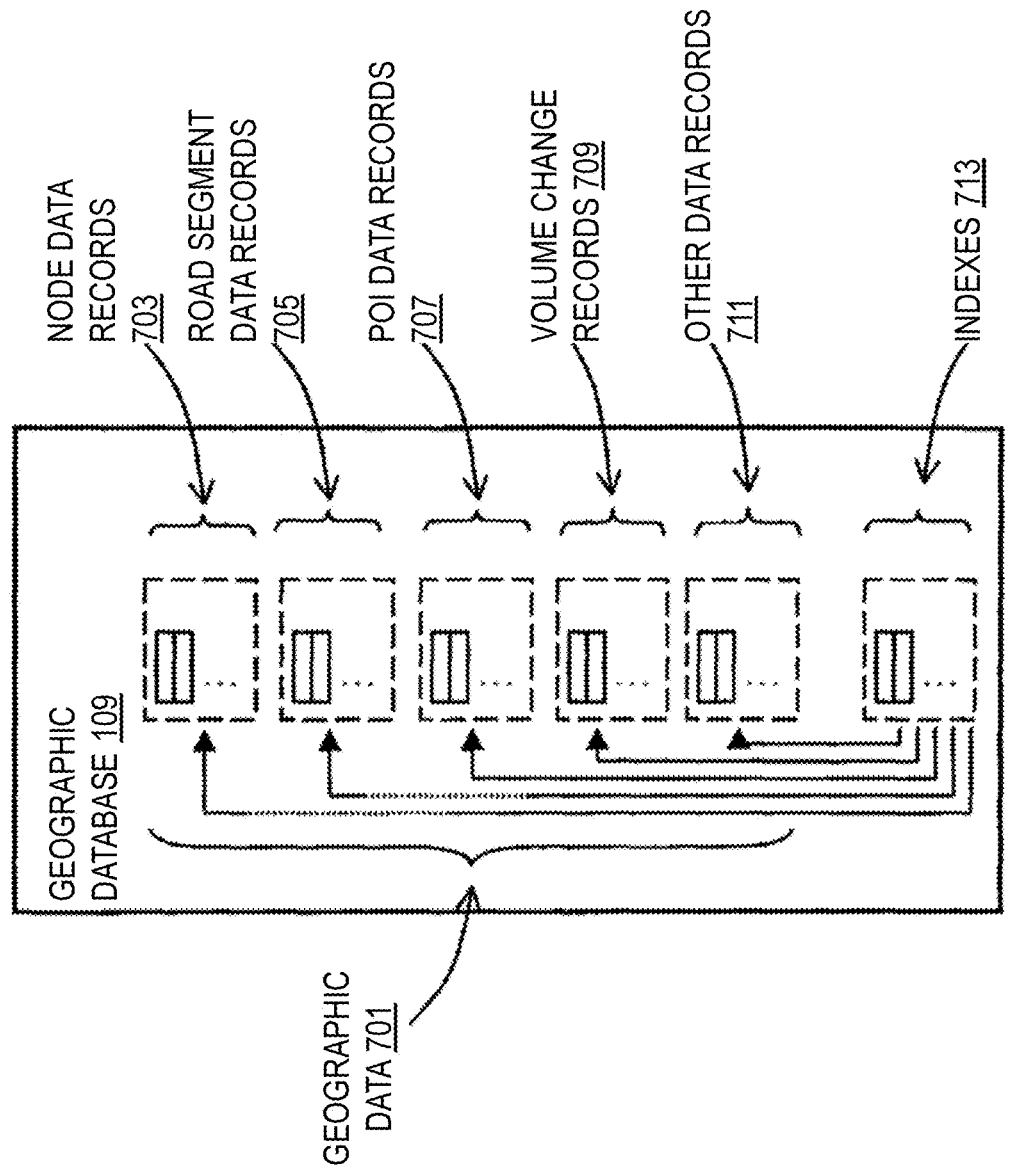
FIG. 7 is a diagram of a geographic database, according to one embodiment.

FIG. 7 is a diagram of a geographic database, according to one embodiment. In one embodiment, the geographic database 123 includes geographic data 701 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road segment or link data records 705, Point of Interest (POI) data records 707, volume change records 709, other records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 123. In one embodiment, the indexes 713 may be used to quickly locate data without having to search every row in the geographic database 123 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. The geographic database 123 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 123 includes the volume change records 709 for current and historical probe data, time window data, road closure detections, road closure reports, road closure evaluations, road closure link graphs, associated vehicle paths, extracted features derived from the probe data, and/or any other related data. The volume change records 709 include a road closure data layer 119 that store the probe anomaly detections generated according to the various embodiments described herein. The road closure data layer 119 can be provided to other system components or end users to provided related mapping, navigation, and/or other location-based services. In one embodiment, the volume change records 709 can be associated with segments of a road link (as opposed to an entire link). It is noted that the segmentation of the road for the purposes of road closure detections can be different than the road link structure of the geographic database 123. In other words, the segments can further subdivide the links of the geographic database 123 into smaller segments (e.g., of uniform lengths such as 5-meters). In this way, road closures or other traffic incidents can be predicted and represented at a level of granularity that is independent of the granularity or at which the actual road or road network is represented in the geographic database 123. In one embodiment, the volume change records 709 can be associated with one or more of the node records 703, road segment or link records 705, and/or POI data records 707; or portions thereof (e.g., smaller or different segments than indicated in the road segment records 1705) to provide situational awareness to drivers and provide for safer autonomous operation of vehicles.

In one embodiment, the geographic database 123 can be maintained by the services platform 117 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 123 is stored as a hierarchical or multilevel tile-based projection or structure. More specifically, in one embodiment, the geographic database 123 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the probe device 101 (e.g., vehicle 103, UE 107). The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing probe anomaly detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
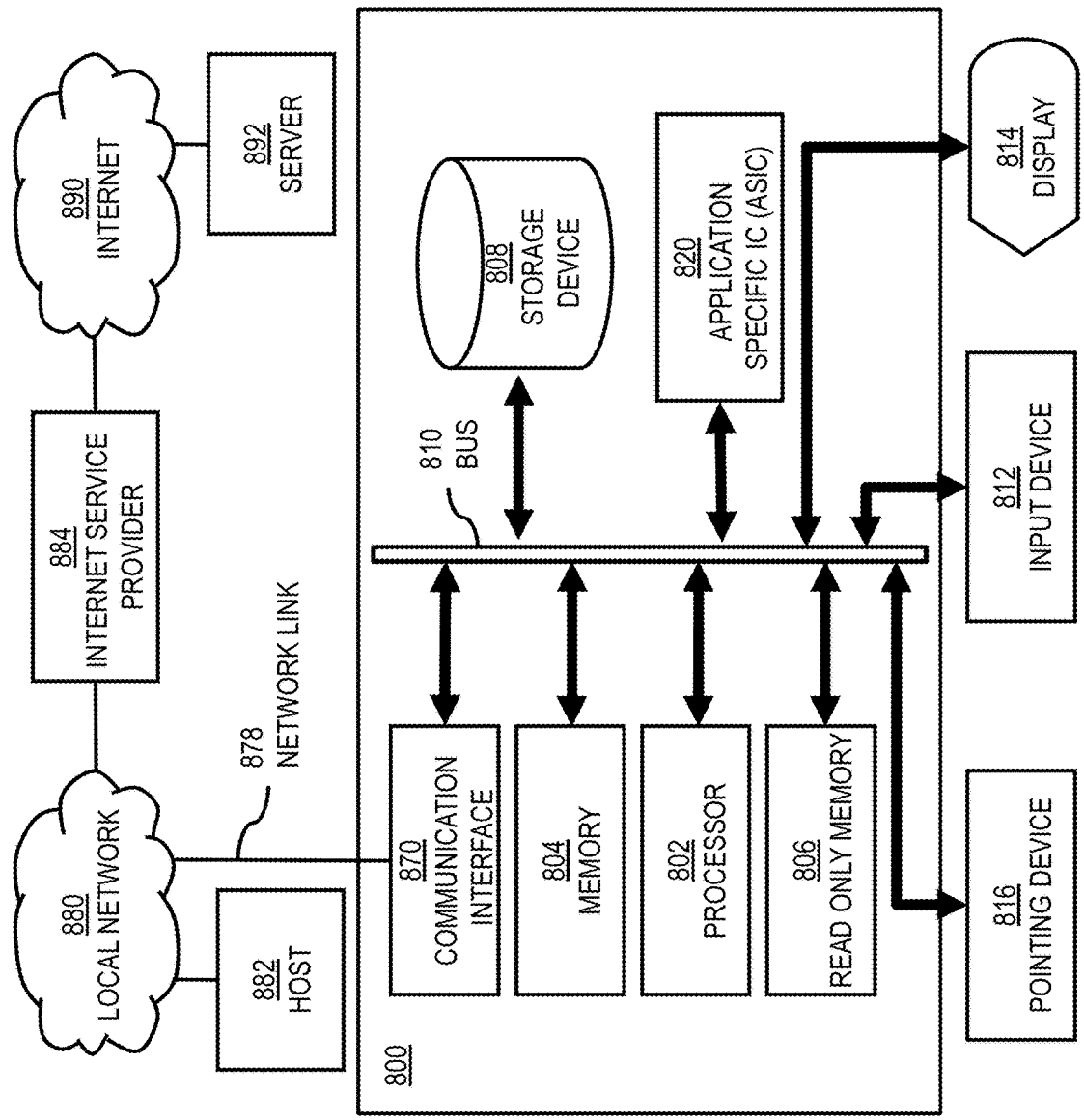
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide probe anomaly detection as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing probe anomaly detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing probe anomaly detection. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing probe anomaly detection, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for providing probe anomaly detection.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide probe anomaly detection as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide probe anomaly detection. The memory 905 also stores the data associated with or generated by the execution of the inventive steps.

Figure 10:
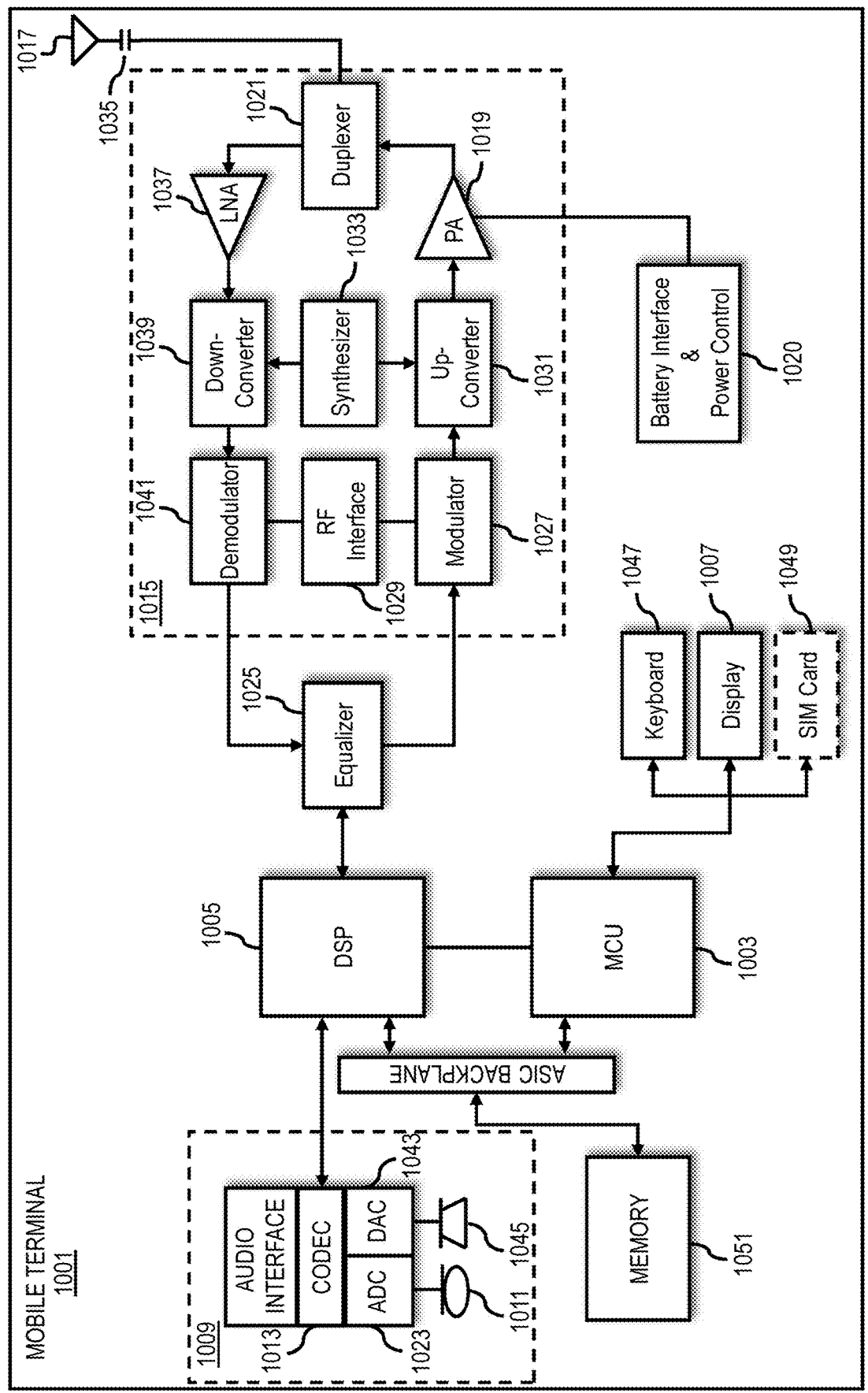
FIG. 10 is a diagram of a mobile terminal (e.g., handset or vehicle or part thereof) that can be used to implement an embodiment.

FIG. 10 is a diagram of exemplary components of a mobile terminal (e.g., embedded device or system of the provide device 101, vehicle 103, and/or UE 107 for accessing or performing the functions of the mapping platform 113 alone or in combination with the mapping platform 113) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide probe anomaly detection. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining an expected vehicle volume for a geographic region over a time epoch, wherein the expected vehicle volume is calculated from historical vehicle volume data;
   determining an actual vehicle volume for the geographic region over the time epoch, wherein the actual vehicle volume is based on current vehicle volume data collected from a plurality of vehicles traveling in the geographic region;
   computing a vehicle volume change based on the expected vehicle volume and the actual vehicle volume; and
   providing the vehicle volume change as an indicator of a probe anomaly in the geographic region,
   wherein the probe anomaly comprises unexpected changes to volume or quality of received probe data at a service provider, and wherein the unexpected changes to the volume or quality of the received probe data comprise one or more of: an outage at the service provider such that probe data is not transmitted for processing, a malfunctioning of a processor at the service provider causing a dropping of the probe data, and low probe data volume received at the service provider due to weather conditions or holidays.

2. The method of claim 1, further comprising:
   determining an inter-epoch variance between the expected vehicle volume and another expected vehicle volume determined for the geographic region over at least one other time epoch.

3. The method of claim 2, further comprising:
   applying a smoothing of the expected vehicle volume over a plurality of time epochs based on determining that the inter-epoch variance is greater than a threshold value.

4. The method of claim 3, further comprising:
   iteratively applying the smoothing of the expected vehicle volume until the inter-epoch variance is below a threshold variance value.

5. The method of claim 3, further comprising:
   applying the smoothing operation to the actual vehicle volume prior to determining the vehicle volume change.

6. The method of claim 3, wherein the smoothing is based on a moving average, a spline, or a combination thereof.

7. The method of claim 2, further comprising:
   varying a size of the geographic region based on the inter-epoch variance.

8. The method of claim 2, further comprising:
   limiting a size of the geographic region based on the inter-epoch variance.

9. The method of claim 1, wherein the historical vehicle volume data is historical probe data collected from the geographic region over the time epoch, the method further comprising:
   processing the historical probe data to determine a historical number of unique vehicles observed in the geographic region over the time epoch,
   wherein the expected vehicle volume is based on the historical number of unique vehicles.

10. The method of claim 1, wherein the current vehicle volume data is current probe data collected from the geographic region over the time epoch, the method further comprising:
    processing the current probe data to determine a current number of unique vehicles observed in the geographic region over the time epoch,
    wherein the actual vehicle volume is based on the current number of unique vehicles.

11. An apparatus comprising:
    at least one processor; and
    at least one memory including computer program code for one or more programs,
    the at least one memory and the computer program code configured to, with the at least one processor, cause the apparatus to perform at least the following,
    determine an expected vehicle volume for a geographic region over a time epoch, wherein the expected vehicle volume is calculated from historical vehicle volume data;
    determine an actual vehicle volume for the geographic region over the time epoch, wherein the actual vehicle volume is based on current vehicle volume data collected from a plurality of vehicles traveling in the geographic region;
    compute a vehicle volume change based on the expected vehicle volume and the actual vehicle volume; and
    provide the vehicle volume change as an indicator of a probe anomaly in the geographic region,
    wherein the probe anomaly comprises unexpected changes to volume or quality of received probe data at a service provider, and wherein the unexpected changes to the volume or quality of the received probe data comprise one or more of: an outage at the service provider such that probe data is not transmitted for processing, a malfunctioning of a processor at the service provider causing a dropping of the probe data, and low probe data volume received at the service provider due to weather conditions or holidays.

12. The apparatus of claim 11, wherein the apparatus is further caused to:
    determine an inter-epoch variance between the expected vehicle volume and another expected vehicle volume determined for the geographic region over at least one other time epoch.

13. The apparatus of claim 12, wherein the apparatus is further caused to:
    apply a smoothing of the expected vehicle volume over a plurality of time epochs based on determining that the inter-epoch variance is greater than a threshold value.

14. The apparatus of claim 13, wherein the apparatus is further caused to:

iteratively apply the smoothing of the expected vehicle volume until the inter-epoch variance is below a threshold variance value.

15. The apparatus of claim 13, wherein the apparatus is further caused to:
apply the smoothing operation to the actual vehicle volume prior to determining the vehicle volume change.

16. A non-transitory computer-readable storage medium carrying one or more sequences of one or more instructions which, when executed by one or more processors, cause an apparatus to at least perform the following steps:
determining an expected vehicle volume for a geographic region over a time epoch, wherein the expected vehicle volume is calculated from historical vehicle volume data;
determining an actual vehicle volume for the geographic region over the time epoch, wherein the actual vehicle volume is based on current vehicle volume data collected from a plurality of vehicles traveling in the geographic region;
computing a vehicle volume change based on the expected vehicle volume and the actual vehicle volume; and
providing the vehicle volume change as an indicator of a probe anomaly in the geographic region,
wherein the probe anomaly comprises unexpected changes to volume or quality of received probe data at a service provider, and wherein the unexpected changes to the volume or quality of the received probe data comprise one or more of: an outage at the service provider such that probe data is not transmitted for processing, a malfunctioning of a processor at the service provider causing a dropping of the probe data, and low probe data volume received at the service provider due to weather conditions or holidays.

17. The non-transitory computer-readable storage medium of claim 16, wherein the apparatus is caused to further perform:
determining an inter-epoch variance between the expected vehicle volume and another expected vehicle volume determined for the geographic region over at least one other time epoch.

18. The non-transitory computer-readable storage medium of claim 16, wherein the apparatus is caused to further perform:
applying a smoothing of the expected vehicle volume over a plurality of time epochs based on determining that the inter-epoch variance is greater than a threshold value.

19. The non-transitory computer-readable storage medium of claim 17, wherein the apparatus is caused to further perform:
iteratively applying the smoothing of the expected vehicle volume until the inter-epoch variance is below a threshold variance value.

* * * * *